United States Patent Office 3,472,911

Patented Oct. 14, 1969

1

2

3,472,911
CATALYST AND PROCESS FOR DIMERIZATION OF OLEFINS

Gert G. Eberhardt, Philadelphia, Pa., and William P. Griffin, Jr., Wilmington, Del., assignors to Sun Oil Company, Philadelphia, Pa., a corporation of New Jersey No Drawing. Filed Aug. 14, 1968, Ser. No. 752,471
Int. Cl. C07c *3/18;* B01j *11/78*
U.S. Cl. 260—683.15 27 Claims

ABSTRACT OF THE DISCLOSURE

Monoolefins are dimerized by contact at a temperature in the range of −100° C. to 200° C., preferably −50° C. to 100° C., with novel catalyst systems formed by combining (1) a tetrahalonickelate complex having the formula $(R_4Q)_2^+(NiX'_4)^{--}$ wherein Q is phosphorus or nitrogen with (2) a Lewis acid which is $RA1X_2$, $R_3A1_2X_3$ or $R_2AlX$. The proportions of the catalyst components are such that the atomic ratio of Al:Ni is in excess of 2:1. The catalysts are used in solution in a suitable liquid medium, e.g., toluene or chlorobenzene.

CROSS REFERENCE TO RELATED APPLICATIONS

United States application Ser. No. 675,280, filed Oct. 16, 1967, describes and claims catalyst systems formed by combining (1) certain nickel halide phosphine complexes, e.g., $(R_3P)_2NiCl_2$, with (2) hydrocarbyl aluminum halides, which catalyst systems are highly active for dimerizing olefins. United States application Ser. No. 678,-211, filed Oct. 26, 1967, describes and claims other catalyst systems formed by combining (1) trihalonickelate complexes of the formula $(R_4P)^+(R_3PNiX_4)^-$ or $$(R_4N)^+(R_3PNiX_4)^-$$

with (2) hydrocarbyl aluminum halides, which systems likewise are highly active for dimerizing olefins. The present invention provides different catalyst systems which are made from another class of halonickel complexes.

BACKGROUND OF THE INVENTION

This invention relates to novel catalyst compositions made from a certain type of nickel (II) complex and to their use in the dimerization and/or codimerization of olefinic hydrocarbons.

In the prior art it has been disclosed (Wilke, Angew. Chem., 78, No. 3, 1966, pp. 170–171; Dutch Patent application 6,409,179, filed Aug. 10, 1963) that olefins can be oligomerized by means of catalysts formed by combining $\pi$-allyl nickel halide phosphine complexes with Lewis acids such as alkyl aluminum dihalides. For example, propylene can be dimerized mainly to 2-methylpentenes by contact with a chlorobenzene solution of a catalyst formed from $\pi$-allyl nickel iodide, triphenylphosphine and ethylaluminum dichloride. If tricyclohexylphosphine is used in the mixture in place of triphenylphosphine, the resulting dimer is mainly 2,3-dimethylbutenes.

It has also been disclosed heretofore (Ewers, Angew. Chem., 78, No. 11, 1966, p. 593) that propylene can be dimerized by a catalyst system formed by combining nickelacetylacetonate, triphenylphosphine and a Lewis acid, e.g., ethylaluminum sesquichloride.

SUMMARY OF THE INVENTION

The invention provides novel nickel-containing catalyst systems formed from a new combination of catalytic components. These new catalysts are useful for dimerizing or codimerizing ethylene, propylene and higher olefins. They are used for this purpose in solution in a suitable solvent, such as a liquid aromatic hydrocarbon or halohydrocarbon.

In accordance with the invention, novel catalyst systems are provided by combining (1) a tetrahalonickelate complex having the formula $(R_4Q_2^+(NiX'_4)^{--}$ with (2) a Lewis acid of the group $RAlX_2$, $R_3Al_2X_3$ and $R_2AlX$, wherein Q is phosphorus or nitrogen, X′ is chlorine, bromine or iodine, X is chlorine or bromine, and all Rs are hydrocarbyl radicals (which can be the same or different hydrocarbyls) except that one of the Rs in the $(R_4Q)^+$ cation can be hydrogen, the atmoic ratio of Al:Ni in the system being in excess of 2:1 and preferably well in excess of this ratio. Dimerization of monoolefin hydrocarbons is readily effected by contacting the monomer with a solution of the catalyst at a temperature in the range of −100° C. to 200° C., more preferably −50° C. to 100° C.

DESCRIPTION OF THE INVENTION

The tetrahalonickelate compounds used in making the present catalysts are quaternary salts of either phosphorus or nitrogen having, respectively, the following formulas:

$$(R_4P)_2^+(NiX'_4)^{--}$$

$$(R_4N)_2^+(NiX'_4)^{--}$$

These compounds thus are bis(phosphonium) or bis(ammonium) tetra-halonickelates, the nickel therein having a valence of two. The active catalyst species results from combining such tetrahalonickelate compound with a Lewis acid which is a hydrocarbyl aluminum chloride or bromide corresponding to any of the following formulas: $RalX_2$; $R_3Al_2X_3$ and $R_2AlX$. In other words the Lewis acid is a hydrocarbyl aluminum dihalide, sesquihalide or monohalide wherein the halogen (X) is chlorine or bromine. Best results are obtained with the sesquihalides.

The Lewis acid and trihalonickelate compound are used in such proportions that the Al:Ni ratio is in excess of 2:1 and preferably is at least 10:1.

In the foregoing formulas, the Rs, both in the tetrahalonickelate compounds and in the Lewis acids, represent any hydrocarbon radical having 1–30 carbon atoms selected from the group consisting of alkyl, cycloalkyl, alkenyl, cycloalkenyl, aryl, aralkyl and aralkenyl, except that one of the Rs in the $(R_4Q)^+$ cation optionally can be hydrogen. Preferably the R groups all are hydrocarbyl groups each having not more than eight carbon atoms. The R group shown in the formulas can be either the same or different hydrocarbyl groups, and the Rs are intended to indicatae any such groups with the exception that it is permissible for one R in the cation moiety to be hydrogen.

The present catalysts can be used for converting monoolefins to oligomers which are mainly dimers of the starting olefins. Any such olefins, whether being terminal or internal olefins, can be made to dimerize and/or codimerize by means of these catalysts, provided that the olefin has its double bond between two carbon atoms neither of which is attached to more than one carbon atom. This applies to straight chain and branched aliphatic olefins as well as to cyclic olefins. In other words the present catalysts can be employed for converting to oligomers (mainly to dimers) any monoolefin in which the double bond is between carbon atoms that have no side substituent such as a methyl group or higher side chain. The catalysts are particularly useful for effecting the dimerization or codimerization of $C_2$–$C_{10}$ aliphatic monoolefins, such as the following: ethylene; propylene; butene-1; butene-2; pentene-1; pentene-2; pentene-3; 4-methylpentene - 1; 3,3-dimethylbutene-1; 3,4-dimethylpentene-1; octene-1; 2,5-dimethylhexene-3; 4-ethylhexene-2; nonenes; etc. Examples of other olefins that can be made to dimerize by means of the present catalysts are dodecenes; cetenes; eicosenes; docosenes; cyclopentene; cyclohexene; methylcyclohexenes; dimethylcyclohexenes and cyclooctene in all of which olefins the carbon atoms forming the double bond have no side substituents. When two or more olefins are present in the charge, codimerization will occur as well as dimerization. Hence, when the term "dimerization" is used herein, it is intended to include codimerization as well if the olefinic charge material contains more than one olefin component.

The dimerization reaction can be carried out by contacting a monoolefin as above specified or a mixture of such olefins with a solution of the catalyst at a temperature in the range of −100° C. to 200° C., more preferably −50° C. to 100° C. The rate of dimerization at any selected reaction temperature will depend upon the particular olefinic charge employed, and will vary inversely with the molecular weight of the starting olefin. The rate also will depend upon the accessibility of the double bond for contact with the catalyst species. The reaction preferably is carried out employing a solvent which has some degree of polarity, as discussed hereinafter.

The reaction product obtained is preponderantly the dimer and/or codimer, or in other words is product resulting from the combination of two molecules of charge olefin per molecule of product. However, minor amounts of higher molecular weight olefins usually are also obtained, perhaps due to interaction of dimer or codimer product with additional charge material or with itself. As a general rule the amount of these higher boiling products can be held to less than 25% by weight of the total olefin reacted by maintaining a relatively high concentration of monomer in the reaction mixture.

The present catalysts are particularly useful for dimerizing propylene mainly to methylpentenes. Such dimers have known utility as feed stock for production of isoprene as well as of various other products (see, for example, Chem. Eng. News, 41, No. 39, p. 1, Sept. 30, 1963). Regardless of whether the R groups in the catalyst components are saturated or aromatic, these catalysts give methylpentenes as the main product when dimerizing propylene. Therein the present catalysts differ from those described in the aforesaid applications Ser. No. 675,280 and Ser. No. 678,211, which give 2,3-dimethylbutenes as the main dimerization product when the R groups in the $R_3P$ moiety of the nickel complex is an electron-donating saturated group such as isopropyl or cyclohexyl. In contrast only a small amount of 2,3-dimethylbutenes are formed when the present catalysts are used in dimerizing propylene.

The present catalyst, in addition to effecting dimerization, can also cause isomerization of the double bond in the olefinic product and to some extent in the starting olefin. Hence the position of the double bond in the dimer product will depend upon the specific conditions under which the reaction is carried out and particularly the length of time at which the dimer is allowed to remain in contact with the catalyst system. For example, when propylene is dimerized, the main dimer initially formed is 4-methylpentene-2; but if this is allowed to remain in contact with the catalyst for substantial time, it tends to isomerize to other methylpentenes. Prolonged contact of the product with the catalyst system after the charge olefin has been consumed may also cause part of the product to dimerize and yield products of still higher molecular weight.

As previously indicated, a solvent is employed in carrying out the present process. Types of solvents that can be used comprise aromatic hydrocarbons and various halogenated hydrocarbons. The solvent must be capable of dissolving the catalyst and must be liquid at the temperature and pressure conditions employed. Liquid aromatic hydrocarbons, such as benzene, toluene or xylene, generally function well as solvents for the present catalyst systems. Solvents having some degree of polarity may result in highest catalytic activity; however, solvents which have high dipole moments, such as water, alcohols, ketones, esters, amines, dioxane and tetrahydrofuran, will irreversibly coordinate with the nickel and deactivate the catalyst. The best solvents are halogenated aliphatic and aromatic compounds in which the halogen is chlorine, bromine, fluorine or combinations of such substituents.

Halohydrocarbons that are suitable as the solvent medium are halobenzenes having 1–2 halogen atoms, trihaloethanes, tetrahaloethanes, trihaloethylenes and tetrahaloethylenes, in which halohydrocarbons the halogen can be chlorine, bromine or fluorine or combinations of such substituents. Particularly suitable solvents are the monohalobenzenes, viz., chlorobenzene, bromobenzene and fluorobenzene, and dihalobenzenes which are liquid at the reaction temperature such as ortho- and meta-dichlorobenzenes, dibromobenzenes or difluorobenzenes. Examples of other halohydrocarbons that can be used are: methyl chloroform; methyl bromoform; 1,1,2-trichloroethane; 1,1,2,2-tetrachloroethane; trifluoroethanes; tribromoethanes; chlorodifluoroethanes; trichlorotrifluoroethanes; tetrafluoroethanes; and similar ethylene derivatives containing 2–4 halogen atoms which are chlorine, bromine and/or fluorine. Many other halogenated hydrocarbon solvents can also be used.

The tetrahalonickelate complexes used in forming the present catalysts are known types of compounds and their preparation has been described in the prior art as discussed in Advances in Inorganic and Radiochemistry, vol. 6, pps. 31–32, Academic Press (1964). One method of preparing the phosphonium complexes involves heating a mixture of a trihydrocarbylphosphine (2 moles), a nickel (II) halide (1 mole) and a hydrocarbyl halide (preferably in excess of 2 moles) to effect reaction as shown in Equation I.

I.

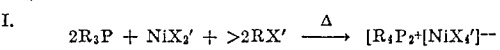

A specific example of this is the reaction (described by Cotton et al., JACS, 83, 344–351 (1961)) of triphenylphosphine, nickel bromide and bromobenzene, as illustrated by Equation II.

II.

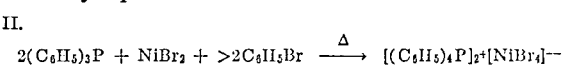

The product in this case is bis(tetraphenylphosphonium) tetrabromonickelate.

Analogous phosphonium salts for use in practicing the invention can also be made by substituting HCl, HBr or HI for RX′ in the reaction. As an example of this, triisopropylphosphine, nickel bromide and hydrogen chloride can be reacted as set forth in Equation III.

III.

Here the product is bis(triisopropylphosphonium)dichlorodibromonickelate. This constitute an example wherein one R in the anion $(R_4P)^+$ is hydrogen while the other Rs are alkyl groups.

An alternative procedure equivalent to the method indicated by Equation I is to react a bis(trihydrocarbylphosphine)nickel halide with at least two moles of a hydrocarbyl halide or hydrogen halide to give the product of Equation I. Such nickel halide complexes are known and also have been described in Advances in Inorganic and Radiochemistry, vol. 6, pps. 27–30. An example of this reaction is shown in Equation IV wherein bis(triphenylphosphine)nickel chloride is reacted with n-octyl chloride.

IV.

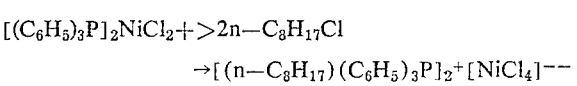

The product in this case is bis(n-octyltriphenylphosphonium)tetrachloronickelate.

Another procedure for preparing the phosphonium complexes comprises reacting nickel halide with at least twice its molar amount of a tetrahydrocarbylphosphonium halide in a hot solvent such as butanol. Equation V is an illustration of this wherein the phosphonium reactant is tetraethylphosphonium chloride.

V.  $NiCl_2 + 2(C_2H_5)_4PCl \rightarrow [(C_2H_5)_4P]_2^+[NiCl_4]^{--}$

The product in this case is bis(tetraethylphosphonium) tetrachloronickelate.

A procedure like that of Equation V can be used to prepare the analogous ammonium salts by using a substituted ammonium halide in place of the phosphonium halide reactant. Such procedure has been described by Gill et al., J. Chem. Soc., pps. 3997–4007 (1959), who carried out the following reactions in ethyl alcohol:

VI.  $NiCl_2 + 2Et_4NCl \rightarrow [Et_4N]_2^+[NiCl_4]^{--}$

VII.  $NiBr_2 + 2(Et)_4NBr \rightarrow [(Et)_4N]_2^+[NiBr_4]^{--}$

The bis(tetraethylamonium)tetrahalonickelates from these reactions were blue compounds and were purified by recrystallization from ethyl alcohol.

The so-prepared phosphonium or ammonium nickelate complex is dissolved in a solvent as described above, and the Lewis acid, which preferably is $R_3Al_2X_3$, is added in a proportion such that in excess of two atoms of aluminum are provided per atom of nickel in the complex. Preferably the proportion of Lewis acid to the complex is well in excess of this proportion. While it is not known with certainty, it is believed that the resulting catalyst is a species formed by the combination of one mole of the nickelate salt with at least two moles of the Lewis acid (i.e., the equivalent of at least two aluminum atoms per atom of nickel). The use of the Lewis acid in less than this 2:1 molar ratio is substantially inoperative. It is distinctly preferable to employ a large excess of the Lewis acid such that the atomic ratio of Al:Ni is in the range of 10:1 to 100:1, and the most desirable ratio generally is of the order 20–30:1. Much larger Al:Ni ratios (e.g., 500:1) are within the scope of the invention. The excess Lewis acid over the 2:1 ratio of Al:Ni acts as a scavenger for impurities, such as moisture and oxygen, which may be present, and also this excess develops the active catalyst species more completely. A large excess of the Lewis acid also is particularly important when an iodide of nickel has been used to prepare the coordination complex (i.e., where at least two X's are iodine), as development of the active catalyst depends upon chlorine or bromine being interchanged with iodine upon addition of the Lewis acid. A large excess of the Lewis acid aids this interchange.

When the nickelate complex and the Lewis acid are mixed, a distinct color change occurs. This color change seems to be indicative of the formation of the desired catalyst species. For example, solutions of the tetrachloro- or tetrabromonickelates usually are blue, but upon addition of the Lewis acid the color generally changes to amber-yellow. These distinct color changes are useful in indicating that the desired catalyst has been formed.

In forming the catalyst as above described, it is distinctly desirable that addition of the Lewis acid to the nickelate complex solution be done in the presence of the olefin to be reacted or, alternatively, another olefin. The preferred procedure is to dissolve a quantity of the olefin in the nickelate complex solution and then mix in the desired amount of Lewis acid. Presence of the olefin in the mixture during addition of the Lewis acid stabilizes the resulting catalyst and gives a more highly active catalyst system than when the components are mixed in the absence of olefin. Usually it is desirable in activating the catalyst to utilize the same olefin as is to be reacted in the process, although a different olefin in limited quantity can be employed in this activation step if desired. For example, propylene under moderate pressure can first be applied to the nickelate complex solution and the Lewis acid then admixed therewith to activate the catalyst, following which another olefin, e.g., hexene-1, can be fed into the mixture to undergo dimerization.

When a highly polar material, e.g., water, is mixed with the catalyst solution, it reacts and causes deactivation of the catalyst. This procedure can be employed, if desired, to deactivate the catalyst after the olefin dimerization reaction has been completed.

Application of the catalyst, prepared as above described, for dimerizing olefins, can be effected merely by contacting the colored catalyst solution with the olefin at any temperature in the range of $-100°$ C. to $200°$ C. which provides a suitable rate of reaction. As previously stated, any monoolefin which has no side substituents at the carbon atoms which form the double bond can be made to dimerize by means of these catalysts. Suitable temperatures of reaction will depend upon the reactivity of the particularly monomer being charged. The reaction occurs in solution. Hence, when the starting olefin would otherwise be gaseous at the reaction temperature selected, sufficient pressure should be used to give it substantial solubility in the catalyst solution.

When the charge is one or more aliphatic olefins of the $C_2$–$C_{10}$ range, a temperature in the range of $-50°$ C. to $100°$ C. generally is preferred. The rate of reaction tends to increase with increasing temperature for the same concentration of olefin in the reaction mixture. With the lower olefins sufficient pressure and also adequate agitation are used so that the gaseous feed will rapidly dissolve in the solution so as to maintain an adequate concentration thereof as the reaction proceeds. The temperature level at which the reaction is carried out has little if any effect on the skeletal structure of the product obtained but can have an influence on double bond position by affecting the rate of double bond isomerization of the dimerization product.

The dimerization reaction can be carried out batchwise or in continuous manner. In the latter case the catalyst solution can be circulated through a contact zone, such as a tank or column, to which the olefin as either a gas or liquid can be continuously or intermittently fed. The reaction zone is maintained at the desired reaction temperature by cooling or heating as required. A stream of catalyst solution containing the reaction product is withdrawn from the contact zone and is introduced into a distillation zone to strip out the reaction product including dimer and any higher boiling material that may have been formed. When operating in this manner a solvent should be selected with a sufficiently high boiling point so that the reaction product can readily be distilled therefrom, leaving as bottoms a solvent solution of the catalyst. This catalyst solution is recycled to the contact zone for reuse. If desired the overhead product can be cohobated to separately recover the dimer fraction from the higher boiling material.

When the olefin charge is contacted in gaseous form with the catalyst solution, as normally will be the case when a lower olefin is used such as ethylene, propylene or butenes, the reaction rate will depend not only on the temperature selected but also on the gas pressure, since the pressure will determine the concentration level of the gas dissolved in the solevnt for contact with the catalyst. The pressure can be regulated to achieve the rate of dimerization desired. As previously mentioned, the catalyst also tends to cause isomerization of the double bond position in the dimer product. This reaction, however, is not related to pressure when the process is conducted at a temperature below the boiling point of the dimer. Hence, by carrying out the reaction at a relatively high pressure to effect dimerization at a rapid rate and then removing dimer from the solution soon after it has been formed, isomerization of the product can be minimized. This procedure is advantageous, for example, when it is desired to maximize production of 4-methylpentene-2 from propylene.

The following examples are specific illustrations of the invention:

EXAMPLE 1

Propylene was dimerized by means of the catalyst resulting from combining bis(benzyltriisopropylphosphonium)tetrabromonickelate with ethyl aluminum sesquichloride ($Et_3Al_2Cl_3$). The nickel complex had been prepared by a reaction analogous to Equation IV, wherein bis(triisopropylphosphine)nickel dibromide was reacted with a large excess of benzyl bromide in hot chlorobenzene solution. Recrystallization of the product from chlorobenzene by addition of pentane as antisolvent gave the above-designated nickelate,

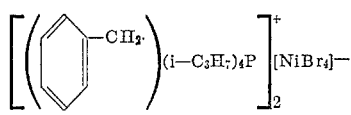

as blue crystals. Specifically, the dimerization reaction was carried out in the following manner. A 250 ml. flask provided with a magnetic agitator, means for cooling, temperature indicating means, and means for applying and maintaining a regulated pressure of propylene in the flask was used. The flask first was charged with 50 ml. of a 0.0004 molar solution in chlorobenzene of the nickelate complex, and nitrogen was bubbled through the solution for 10 minutes to effect deaeration. A propylene pressure of 100 mm. Hg above atmospheric pressure wax next applied. While the mixture, initially at room temperature, was being stirred the Lewis acid was added in amount to provide an atomic ratio of Al:Ni of 40:1, and as dimerization occurred additional propylene was automatically admitted to maintain the propylene pressure at 100 mm. Hg. Within about two minutes following addition of the propylene the mixture was cooled to 0° C. and the reaction was continued at that temperature for a total of 100 minutes. Reaction was then stopped by the addition of a small amount of aqueous alcohol to the flask in order to deactivate the catalyst. The amount of propylene consumed during the reaction period was measured and the corresponding average rate of reaction was calculated to be about 49 kg./g. nickel/hr. No major change in reaction rate during the reaction period occurred, thus showing that catalyst activity throughout the run remained substantially unchanged. VPC analysis of the reaction product showed that it was composed by weight of 84% dimers and 16% trimers, and that the composition of the dimer fraction was as follows:

| | Percent |
|---|---|
| 2-methylpentene-1 | 4 |
| 2-methylpentene-2 | 48 |
| 4-methylpentene-1 | 1 |
| 4-methylpentene-2 | 34 |
| 2,3-dimethylbutenes | 5 |
| n-hexenes | 8 |

From these results it can be seen that about 87% of the dimer product was methylpentenes.

EXAMPLE 2

The preceding example was substantially repeated except that in this instance benzene was used as the solvent instead of chlorobenzene, a larger amount of $Et_3Al_2Cl_3$ was employed equivalent to an Al:Ni ratio of 200:1, and the total reaction time was reduced to 20 minutes. The average rate of reaction was found to be 39 kg. of propylene/g. of nickel/hr. Analysis of the product showed that it was composed substantially entirely of dimers with no higher oligomers, and that the dimer product had the following composition:

| | Percent |
|---|---|
| 2-methylpentene-1 | 2 |
| 2-methylpentene-2 | 28 |
| 4-methylpentene-1 | 1 |
| 4-methylpentene-2 | 58 |
| 2,3-dimethylbutenes | 5 |
| n-hexenes | 6 |

Comparison of the dimer composition in Examples 1 and 2 shows a substantially higher content of 4-methylpentene-2 in the second run. This was mainly due to the shorter reaction time used, which reduced the extent to which double bond isomerization could occur to convert the initially formed 4-methylpentene-2 to other methylpentenes.

When other phosphonium tetrahalonickelate complexes as hereindefined are substituted for the nickelate salt used in the foregoing examples, substantially equivalent results are obtained. Also the use of ammonium analogues as above described in place of the phosphonium tetrahalonickelate gives analogous results. Substitution of $RAlX_2$ or $R_2AlX$ in place of $R_3Al_2X_3$ for making either the phosphonium-containing or ammonium-containing catalyst system also results in catalysts effective for purposes of the invention, although the resulting catalysts generally are not as highly active as when the Lewis acid is a sesquichloride or sesquibromide. Olefin hydrocarbons other than those shown in the foregoing examples can be dimerized in analogous fashion by means of the present catalysts, provided that the olefin monomer has its double bond between carbon atoms neither of which has a side substituent.

The invention claimed is:

1. A catalyst system which is a combination of (1) a tetrahalonickelate complex having the formula $$(R_4Q)_2^+(NiX_4')^{--}$$

with (2) a Lewis acid of the group $RAlX_2$, $R_3Al_2X_3$ and $R_2AlX$, wherein Q is phosphorus or nitrogen, X' is chlorine, bromine or iodine, X is chlorine or bromine and all Rs are hydrocarbyl radicals except that one of the Rs in the $(R_4Q)^+$ cation can be hydrogen, the atomic ratio of Al:Ni in the system being in excess of 2:1.

2. A catalyst system according to claim 1 wherein X' is chlorine or bromine.

3. A catalyst system according to claim 2 wherein Q is phosphorus.

4. A catalyst system according to claim 3 wherein said Lewis acid is $R_3Al_2X_3$.

5. A catalyst system according to claim 3 wherein the atomic ratio of Al:Ni is in the range of 10:1 to 100:1.

6. A catalyst system according to claim 5 wherein said Lewis acid is $R_3Al_2X_3$.

7. A catalyst system according to claim 2 wherein Q is nitrogen.

8. A catalyst system according of claim 7 wherein said Lewis acid is $R_3Al_2X_3$.

9. A catalyst system according to claim 7 wherein the atomic ratio of Al:Ni is in the range of 10:1 to 100:1.

10. A catalyst system according to claim 9 wherein said Lewis acid is $R_3Al_2X_3$.

11. A process for dimerizing an olefinic hydrocarbon which comprises contacting a monoolefin having a double bond between two carbon atoms neither of which is attached to more than one other carbon atom with a liquid solution of a catalyst system as defined in claim 1 and at a temperature in the range —100° C. to 200° C.

12. A process according to claim 1 wherein said temperature is in the range of —50° C. to 100° C.

13. A process according to claim 12 wherein X' is bromine or chlorine and all X's in the $(R_4Q)^+$ cation are hydrocarbyl.

14. A process according to claim 13 wherein Q is phosphorus.

15. A process according to claim 14 wherein said Lewis acid is $R_3Al_2X_3$.

16. A process according to claim 14 wherein the atomic ratio of Al:Ni is in the range of 10:1 to 100:1.

17. A process according to claim 14 wherein said olefin is a $C_2$–$C_{10}$ aliphatic olefin.

18. A process according to claim 17 wherein said olefin is propylene.

19. A process according to claim 13 wherein Q is nitrogen.

20. A process according to claim 19 wherein said Lewis acid is $R_3Al_2X_3$.

21. A process according to claim 20 wherein the atomic ratio of Al:Ni is in the range 10:1 to 100:1.

22. A process according to claim 19 wherein said olefin is a $C_2$–$C_{10}$ aliphatic olefin.

23. A process according to claim 22 wherein said olefin is propylene.

24. A process according to claim 11 wherein said olefin is propylene, X' is chlorine or bromine, and the atomic ratio of Al:Ni is in the range 10:1 to 100:1.

25. A process according to claim 24 wherein each R group in the catalyst components is a hydrocarbyl group having not more than eight carbon atoms.

26. A catalyst system according to claim 3 wherein each R group in the catalyst components is a hydrocarbyl group having not more than eight carbon atoms.

27. A catalyst system according to claim 7 wherein each R group in the catalyst components is a hydrocarbyl group having not more than eight carbon atoms.

References Cited

UNITED STATES PATENTS

| | | | |
|---|---|---|---|
| 3,306,948 | 2/1967 | Kealy | 260—680 |
| 3,355,510 | 11/1967 | Cannell et al. | 260—683.15 |

PAUL M. COUGHLAN, Jr., Primary Examiner

U.S. Cl. X.R.

252—429